US012691721B2

(12) United States Patent
    Jameson

(10) Patent No.:    US 12,691,721 B2
(45) Date of Patent:       Jul. 28, 2026

(54) SUSPENSION DAMPING FOR A VEHICLE

(71) Applicant: Holley Performance Products, Inc., Bowling Green, KY (US)

(72) Inventor: Tyler M. Jameson, Tucson, AZ (US)

(73) Assignee: ADS Performance Group LLC, Tuscon, AZ (US)

( * ) Notice: Subject to any disclaimer, the term of this patent is extended or adjusted under 35 U.S.C. 154(b) by 0 days.

(21) Appl. No.: 19/303,970

(22) Filed: Aug. 19, 2025

(65) Prior Publication Data

US 2026/0054538 A1     Feb. 26, 2026

Related U.S. Application Data

(60) Provisional application No. 63/685,098, filed on Aug. 20, 2024.

(51) Int. Cl.
B60G 17/08       (2006.01)
B60G 13/08       (2006.01)

(52) U.S. Cl.
CPC ............. B60G 17/08 (2013.01); B60G 13/08 (2013.01); *B60G 2202/24* (2013.01); *B60G 2204/62* (2013.01); *B60G 2206/41* (2013.01); *B60G 2500/104* (2013.01); *B60G 2500/114* (2013.01); *B60G 2600/21* (2013.01); *B60G 2800/162* (2013.01); *B60G 2800/916* (2013.01)

(58) Field of Classification Search
CPC ............ B60G 17/08; F16F 9/3405; F16F 9/34
See application file for complete search history.

(56) References Cited

U.S. PATENT DOCUMENTS

| | | | | |
|---|---|---|---|---|
| 1,313,763 | A | * | 8/1919 | Thomas .................... F16F 9/48 |
| | | | | 16/57 |
| 2006/0011432 | A1 | * | 1/2006 | Turner .................... F16F 9/512 |
| | | | | 188/322.15 |
| 2012/0018264 | A1 | | 1/2012 | King |
| 2017/0100978 | A1 | | 4/2017 | Marking |
| 2021/0003190 | A1 | * | 1/2021 | Deferme ................ F16F 9/464 |
| 2022/0341481 | A1 | * | 10/2022 | Roessle ................ F16F 9/3242 |
| 2025/0257785 | A1 | * | 8/2025 | Slusarczyk .......... F16F 9/3488 |

FOREIGN PATENT DOCUMENTS

| | | | | | |
|---|---|---|---|---|---|
| DE | 102006015716 | B4 | * | 7/2014 | .......... B60G 15/068 |
| WO | WO-2018180433 | A1 | * | 10/2018 | .............. F16F 9/532 |
| WO | WO-2019182858 | A1 | * | 9/2019 | ........... F16F 9/5126 |
| WO | WO-2019221098 | A1 | * | 11/2019 | ........... F16F 13/007 |
| WO | WO-2024020658 | A1 | * | 2/2024 | ............. B62K 25/08 |
| WO | WO-2024172203 | A1 | * | 8/2024 | ................ F16F 9/49 |

OTHER PUBLICATIONS

U.S. Appl. No. 63/685,098, filed Aug. 20, 2024 titled Suspension Damping for a Vehicle.

* cited by examiner

*Primary Examiner* — Nicole T Verley
(74) *Attorney, Agent, or Firm* — Brooks Kushman P.C.

(57) ABSTRACT

Present embodiments relate to suspension damping for a vehicle. More specifically, but without limitation, present embodiments relate to bypass valve assemblies which provide for adjustment of fluid bypass within the suspension damper to tune the suspension system of the vehicle.

12 Claims, 9 Drawing Sheets

100

112

114

116

115

118

117

120

119

102

104

106

121

116, 118

114

HOLD ZONE

FIRST STAGE

SECOND STAGE

TOP OUT ZONE

SUSPENSION DAMPING FOR A VEHICLE

INCORPORATION BY REFERENCE

This application claims the benefit of U.S. provisional application Ser. No. 63/685,098 filed Aug. 20, 2024, the disclosure of which is hereby incorporated in its entirety by reference herein.

BACKGROUND

1. Field of the Invention

Present embodiments relate to suspension damping for a vehicle. More specifically, but without limitation, present embodiments relate to suspension dampers which provide for adjustment of fluid bypass within the suspension dampers to tune the suspension system of the vehicle.

2. Description of the Related Art

Suspension systems of a vehicle provide damping of bumps and debris both on road and off-road. The suspension systems typically comprise a spring and shock absorbers or dampers, which control or limit spring movement of the suspension system. The suspension dampers retract in compression when a bump or object is encountered, and extend or rebound when the vehicle passes the bump or object. It is desirable that the suspension system force the tires to remain in contact with the ground for controlled vehicle operation. Some dampers utilize a viscous fluid to control movement in compression and rebound. The fluid controls in such a way that a piston within the cylinder doesn't bottom out in compression and doesn't reach a maximum extension. Controlling this overextension or overretraction (bottoming out) is desirable to maintain the tires in contact with the road.

Since different situations may require differing suspension setups, it may be desirable to have a capability to adjust the damping of the damper to accommodate different driving conditions.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

According to some embodiments, the instant suspension damper provides a plurality of bypass valve assemblies wherein the fluid flow may be varied by adjusting each valve and provide multiple by-pass flow rates. As a result, the amount of damping may be controlled depending on the valve configuration a user selects and may vary at each of the different locations along the suspension damper axial direction of damping.

According to some embodiments, a suspension damper may comprise an external cylinder and a piston movable within the external cylinder, said piston having a piston rod. An internal sleeve is positioned within the external cylinder, the internal sleeve having one or more thru holes for transfer of fluid from within the internal sleeve to between the internal sleeve and the external cylinder, and a plurality of detents disposed on the internal sleeve. A fluid reservoir which houses a damping fluid, the fluid reservoir in fluid communication with the external cylinder by connection with first and second fluid conduits. Two or more bypass valve assemblies disposed between the internal sleeve and the external cylinder, each of the bypass valve assemblies comprising: a fixed valve seat positioned on an exterior of the internal sleeve, a floating valve ring, and an adjustable valve seat, wherein a position of the adjustable valve seat may be varied to adjust a gap between the adjustable valve seat and the floating valve ring.

In some embodiments, the internal sleeve may further comprise a fixed detent for positioning of the fixed valve seat.

In some embodiments, the plurality of detents may further comprise a helical arrangement to provide differing axial spacing between the adjustable valve seat and the floating valve ring.

In some embodiments, the thru hole may be positioned between the floating valve ring and the adjustable valve seat.

In some embodiments, the adjustable valve seat may be rotatable to different positions of the helical arrangement of the plurality of detents.

In some embodiments, the different positions change the axial spacing between the adjustable valve seat and the floating valve ring.

In some embodiments, the adjustable valve seat and the floating valve ring each may have an axially oriented spring seat.

In some embodiments, the suspension damper may further comprise a spring disposed in said axially oriented spring seat between the adjustable valve seat and the floating valve ring.

In some embodiments, the two or more bypass valve assemblies may be spaced apart axially between the external cylinder and the internal sleeve.

In some embodiments, the two or more bypass valve assemblies may be spaced apart axially along the internal sleeve.

In some embodiments, each of the two or more adjustable bypass valve assemblies allow variation of flow rate therethrough.

In some embodiments, the two or more adjustable bypass valve assemblies allow for tuning of bypass flow at different locations along an axial length of the internal sleeve to change the force needed to move the piston.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a suspension damper will now be described by way of examples. These embodiments are not to limit the scope of the claims as other embodiments of a suspension damper will become apparent to one having ordinary skill in the art upon reading the instant description. Non-limiting examples of the present embodiments are shown in figures wherein:

DETAILED DESCRIPTION

Figures 1A, 1B:
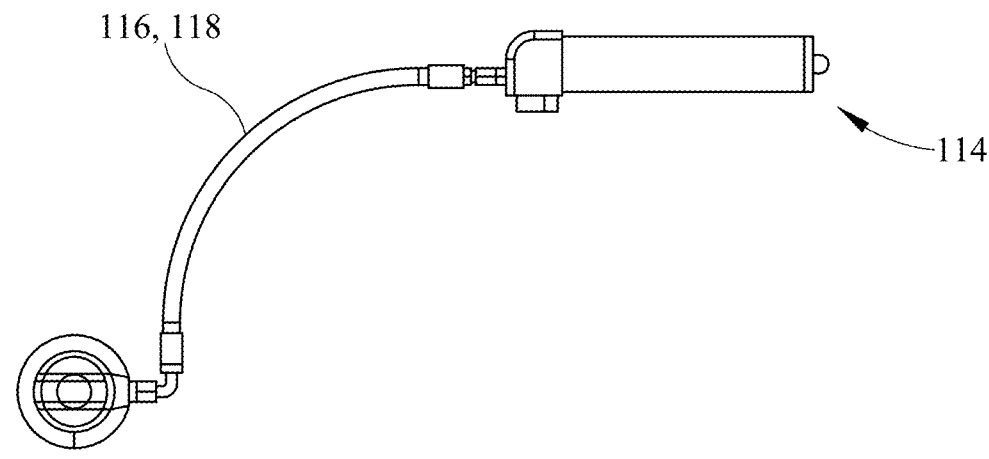
FIG. 1A is an elevation view of a suspension damping assembly, according to some embodiments.
FIG. 1B is a top view of the suspension damping assembly of FIG. 1A, according to some embodiments.

It is to be understood that the suspension damper is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Referring now to FIGS. 1-9, present embodiments provide a suspension damper which comprises a user adjustable valve to vary flow rate within the damper to vary the damping that occurs by the damper. The variation of the flow rate and the damping therefore allows adjustment of the suspension damper for tuning of the suspension system. The suspension damper may comprise multiple bypass valve assemblies which may individually be adjusted to vary the flow rate and therefore damping at different axial positions of the suspension damper. Accordingly, the amount of damping at different locations may be tuned.

Figure 2:
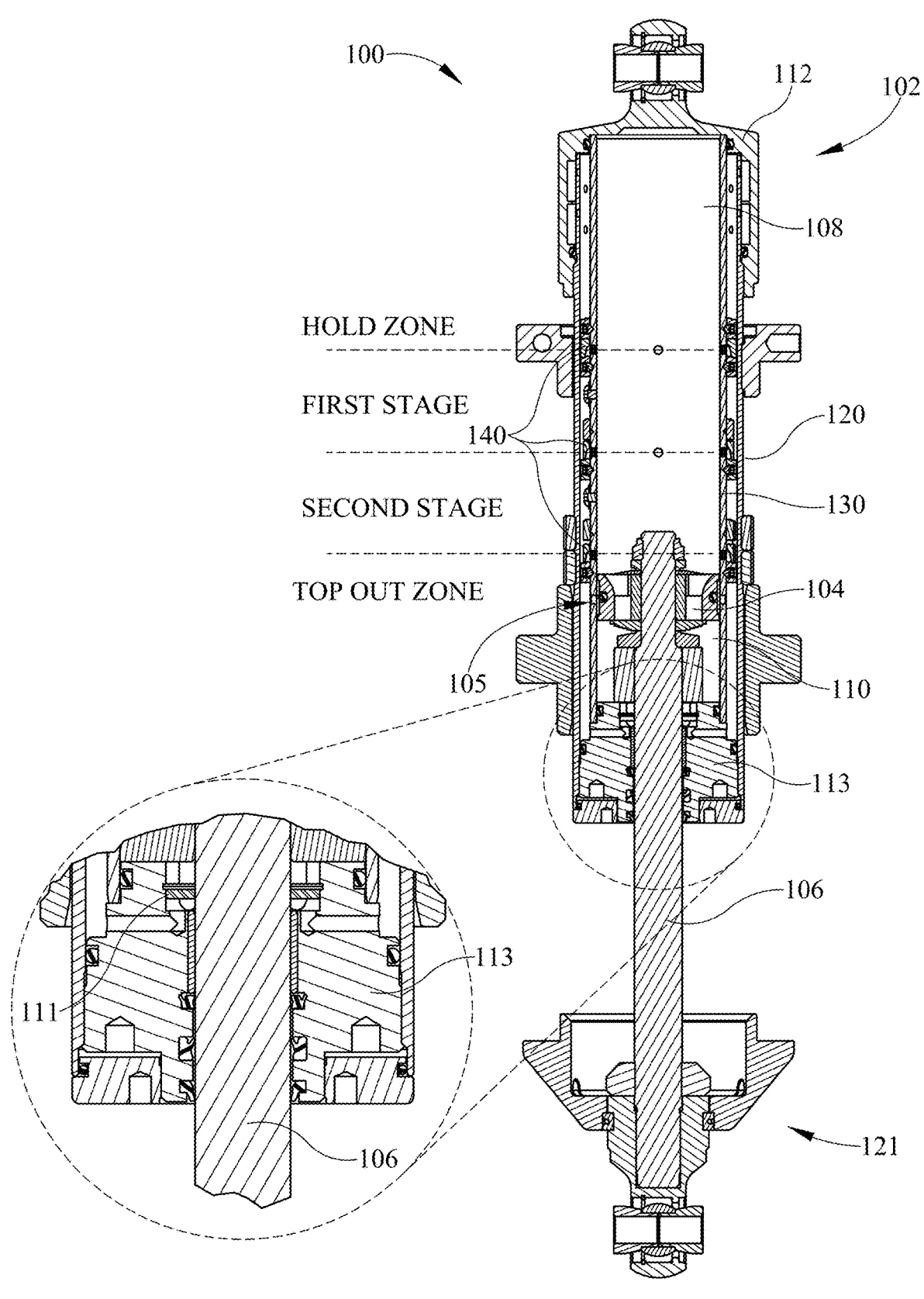
FIG. 2 is a section view of a suspension damping assembly in an extended position, according to some embodiments.

Referring now to FIGS. 1A and 1B, a side and top elevation view of an exemplary suspension damper, or shock, 100 are depicted. The suspension damper, or shock, 100 comprises a fluid filled housing 102 that slidably retains a piston 104. The housing 102 may, in some embodiments, be cylindrical in shape and as described later herein, may comprise an external cylinder 120 and a sleeve or internal cylinder 130 (FIG. 2). The piston 104 is coupled to one end of a piston rod 106. The piston 104 may comprise a head 105 (FIG. 2) and the piston rod 106 that extends from the head 105. The piston 104 divides the housing 102 generally into an upper fluid chamber 108 (FIG. 2) and a lower fluid chamber 110 (FIG. 2) and moves within the housing 102 based on road or terrain conditions. As the piston 104 moves, the upper fluid chamber 108 and the lower fluid chamber 110 may change volume. An opposing end of the piston rod 106 extends out beyond the housing 102. During compression, the piston rod 106 is pushed/forced within the housing 102 in a direction toward the top cap 112 of the suspension damper 100. During rebound, the piston rod 106 is forced within the housing 102 in a direction away from the top cap 112 of the suspension damper 100. The force required to move the fluid between the two fluid chambers 108, 110 gives the suspension damper 100, in part, its compression and rebound resistance. The path of movement of the piston 104 is called the stroke and more specifically, the term stroke refers to the amount of movement of the piston 104 from a fully compressed to fully extended position. FIG. 1 depicts the suspension damper 100 extended (rebound) since the piston rod 106 and piston 104 are moving and extended away from the top cap 112 of the suspension damper 100. During rebound, viscous fluid from the lower fluid chamber 110 is forced past different channels in the piston 104 and flows into the upper fluid chamber 108. Additionally, or alternatively, the viscous fluid may also move between the external cylinder 120 and the internal sleeve 130 (FIG. 2).

Also shown in the figure is a fluid reservoir 114. The suspension damper 100 includes a reservoir 114 which is connected by conduits 116, 118 to the external cylinder 120, and specifically the top cap 112 of the external cylinder 120. The conduits 116, 118 may be rigid or may be flexible, for example rubber based tubes in some embodiments. The reservoir 114 retains the viscous fluid that moves to and from the suspension damper 100 wherein the reservoir contains excess fluid supply for the suspension damper 100.

Moving down the assembly, is a spring nut 115. The spring nut 115 functions as an upper spring seat and allows for preload adjustment to adjust ride height up and down depending on position, this engages the threaded outer body or external cylinder 120.

Below the spring nut 115 are cross-over rings 117 and a spring divider 119. The cross-over rings 117 are threaded rings, for example two, that are positioned along the external cylinder 120 and function as a jam nut against each other to maintain position. Adjusting the position alters the engagement point of the lower spring allowing for a secondary spring rate as the suspension damper 100 is compressed increasing in rate during compression once contacted, also known as dual rate. The spring divider 119 is a free floating divider which centers and guides the spring (not shown) along the housing 102 and acts as a contact point for the cross-over rings 117 to act against. Near the bottom of the housing 102 is a seal head 105 (FIG. 2), wherein the piston 104 passes through for positioning within the housing 102. At the bottom of the piston rod 106 is the bottom cap 121 which serves as a seat for a spring (not shown). The bottom cap 121 is movable with the piston rod 106 up and down relative to the housing 102 and with the spring seated on a lower perch thereon, the spring is compressed, or extends upon rebound.

Figure 3:
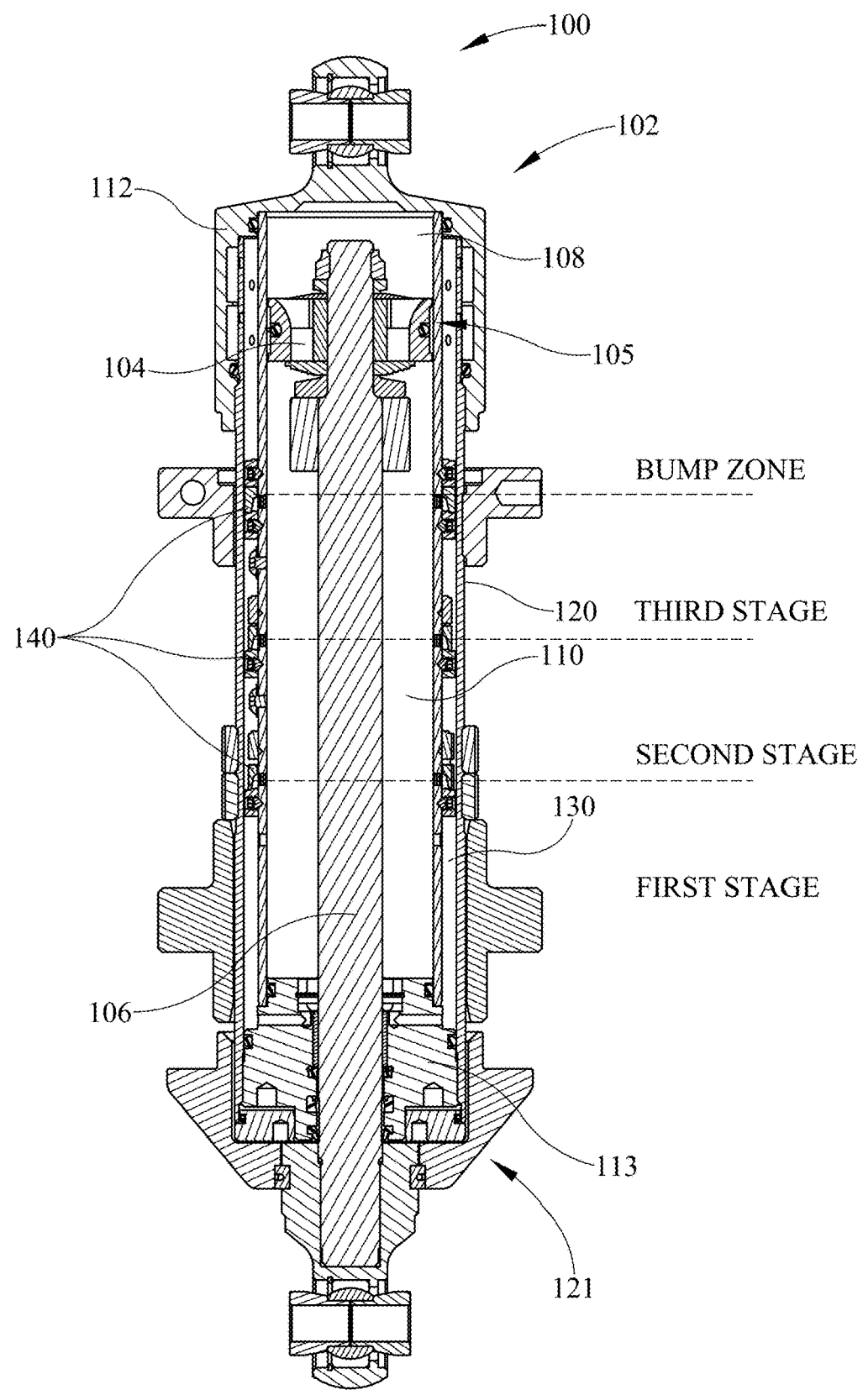
FIG. 3 is a section view of a suspension damping assembly in a retracted position, according to some embodiments.

Referring now to FIG. 2, a section view of the suspension damper 100 is shown. The comparison of the FIGS. 2-3 depicts the travel of the piston 104 within the sleeve 130. The section views depict the external cylinder 120 that defines the housing 102. Within the external cylinder 120 is the internal cylinder or sleeve 130. The piston 104 is shown within the internal cylinder, or sleeve 130, and moves therein when the piston rod 106 is extended (bounce) (FIG. 2) or retracted (compression) (FIG. 3).

With reference to FIG. 2, when the piston rod 106 is rebounding or moving in an extension direction outwardly, various zones are defined. Moving from the top down-wardly, a hold zone is defined at an upper end, then a first stage (zone), then a second stage (zone), and lastly a top out zone near the bottom. When the seal head 105 is in the hold zone, the suspension damper 100 is fully compressed and all damping is controlled by shims on the piston 104. There is no bypass of fluid. As the piston rod 106 extends from the hold position, the first stage, or rebound zone 1, is controlled by an upper bypass valve assembly 140. The bypass valve assembly 140 will allow the piston 104 to extend faster and closing the valve assembly 140 will slow the piston 104 extension. When the piston head 105 reaches the second stage, or rebound zone 2, the second bypass valve assembly 140 from the top may control this movement. Opening this second bypass valve assembly 140 speeds movement of the piston rod 106 and closing the second valve slows move-ment of the piston rod 106. The bypass valve 140 may open more due to less spring force and this zone may be associ-ated as being at or below ride height. Generally this zone allows the tires and axle to follow the terrain without restriction. In the top out zone, the piston 104 movement is slowed, thus the bypass valve 140 is closed more to limit fluid movement. A check valve 111 in the midcap/seal housing 113 closes as the piston 104 enters the top out zone which causes the slowing of the piston 104. This basically stops any bypass flow and directs all fluid movement through piston rebound valving.

The upper end of the suspension damper 100 comprises the top cap 112, where the connections are provided for conduits extending from the reservoir 114. At the lower end of the external cylinder 120 is a midcap/seal housing 113. The midcap/seal housing 113 seals the lower end of the sleeve 130 and the external cylinder 120. The midcap/seal housing 113 also has an opening and one or more seals wherein the piston rod 106 extends therefrom. The midcap/ seal housing 113 may also comprise a seal and a check valve 111 therein which limits fluid flow when the piston rod 106 approaches top out zone near full extension, which forces all fluid through the bypass valves 140, and slows the move-ment of the piston 104.

The external cylinder 120, and the internal sleeve 130, define a pathway for fluid to move therebetween. This is referred to as an internal bypass arrangement. The suspen-sion damper 100 provides the two or more bypass valve assemblies 140 that allow fluid to move between the external cylinder 120 and the sleeve 130. As the piston 104 moves through the sleeve 130 in the compression, the fluid may be forced from the sleeve 130 through the bypass valve assem-blies 140. By providing two or more bypass valve assem-blies 140, various zones may be established where firmness of the suspension damper 100 may be adjusted. The various individual bypass assemblies 140 may be individually tuned or adjusted in order to vary the firmness of the suspension in different areas of travel of the piston 104. For example, in compression, the bypass valves 140 may be adjusted to allow lesser fluid flow the farther the compression, so that the suspension damper 100 is stiffer when closer to bottom-ing out.

As the piston 104 moves downward in the sleeve 130 in extension, the viscous fluid is moved from the lower fluid chamber 110 and enters the upper fluid chamber 108.

Referring now to FIG. 3, a section view of the shock 100 is depicted wherein the piston 104 and piston rod 106 are shown in a compressed configuration. During compression, fluid from the upper fluid chamber 108 is forced past channels in the piston 104 and flows into the lower fluid chamber 110. Whereas the upper chamber 108 volume is large in FIG. 2, the upper chamber 108 volume is small in FIG. 3. With the regard to the opposite lower chamber 110, the opposite is true.

In moving through compression, the piston 104 starts at the bottom of the suspension damper 100. To start the compression event or movement, the piston may start at any zone and move upward to the position depicted. Movement of the piston 104 is described from the bottom zone (first stage) and moving upwardly. The piston 104 generally may be located in a lowermost zone, or first stage, and returns toward ride height. The change or return to ride height may occur quickly in order to prevent the chassis from being affected by terrain. Accordingly, the lowermost bypass valve assembly 140 may be more easily openable, with low cracking pressure, to allow more fluid flow and faster response as the piston 104 moves through the first stage. The middle bypass valve assembly 140 may be more closed than the lowermost bypass assembly below. The middle bypass valve 140 thus slows the movement of the piston 104 through the second stage and reduces likelihood of "bot-toming out" as the piston 104 moves upwardly. The third or upper bypass valve assembly 140 controls movement of the piston 104 through the third stage. This uppermost valve 140 may be more closed to limit piston 104 movement approach-ing the bump zone. Above the third bypass valve assembly 140 is the bump zone. This is an internal bump stop. The bump zone is the final stage towards the top cap 112. This stage is not controlled but, lacks any fluid bypass and thus requires fluid to flow thru the piston and compression valving solely.

Figure 4:
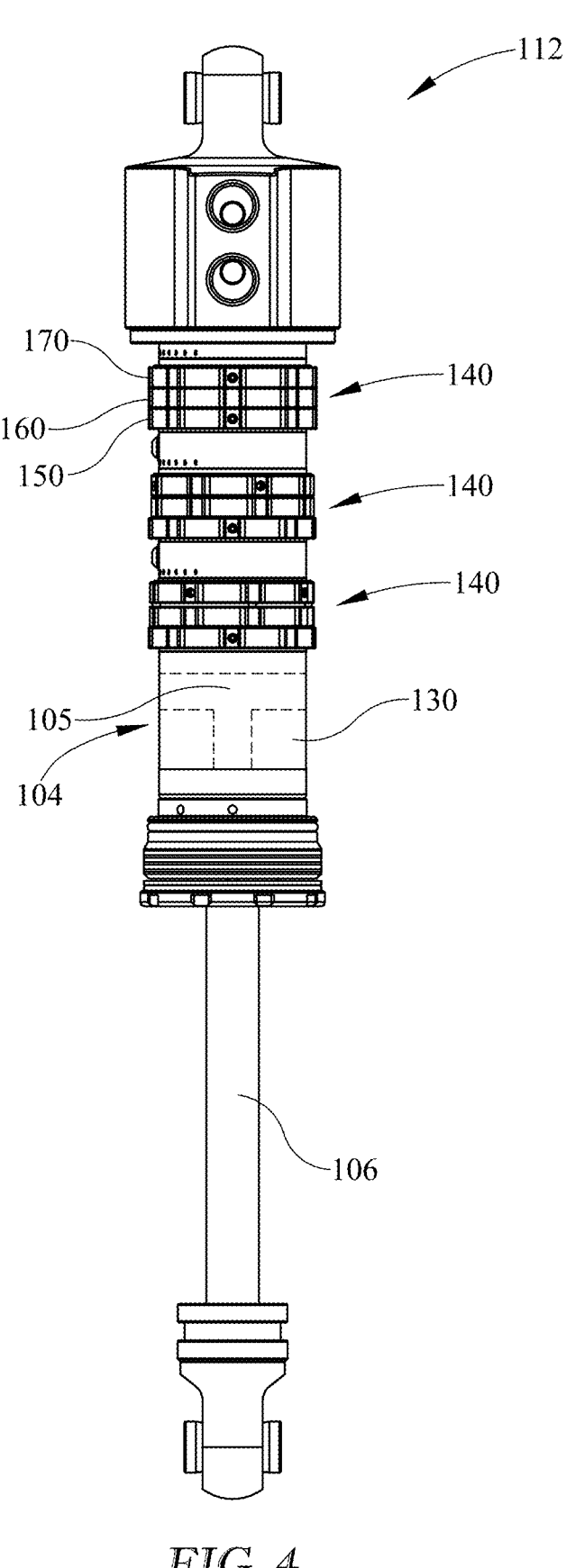
FIG. 4 is a view of a suspension damping assembly with external cylinder removed to show the adjustable bypass assemblies, according to some embodiments.

Referring now to FIG. 4, a side view of the internal cylinder, or sleeve 130, is depicted with the plurality of bypass valve assemblies 140 is shown on the outer surface of the sleeve 130. The bypass valve assemblies 140 define zones therebetween which allows for tuning of movement of the piston 104 between the fully compressed and fully extended positions. The view depicts an embodiment having three bypass valve assemblies 140 on the sleeve 130 but fewer or more may be utilized depending on the length of the suspension damper 100, travel distance. As may be gleaned, each valve assembly 140 defines a location where fluid may pass from inside the sleeve 130 to the exterior and within the external cylinder, or housing 120. As noted previously, each bypass valve assembly 140 provides an opportunity for independent tuning by adjustment of the valve assemblies 140 and the amount of viscous fluid that may flow therethrough. By adjusting the amount of flow through each bypass valve assembly 140, the firmness or softness of the suspension may be adjusted when the piston 104 is in the area of any specific valve assembly 140. Generally, as the piston 104 moves, the force required for movement of fluid through the bypass valves 140 increases to increase the force required to move the piston 104.

Each bypass valve assembly 140 comprises three rings 150, 160, 170 that are disposed on and axially spaced along the sleeve 130, and specifically on a flow through apertures 136 (FIG. 5B) of the sleeve 130. When under pressure, the viscous fluid within the sleeve 130 moves through the aperture 136 in the sleeve 130 and moves one of the rings 150, 160, 170 to allow the viscous fluid to move between the sleeve 130 and the external cylinder 120 (FIG. 2). Each aperture 136 or fluid port orifice is fixed and the flow rate is adjusted by moving (rotating) the adjustable valve seat 170 to alter actual flow rate and crack pressure, first setting providing the least amount of flow in turn creating the most resistance, each position allows for additional flow and reduced crack pressure on the compression stroke. The higher the spacing between the floating ring 160 and the adjustable valve seat 170, the greater the flow and less crack pressure.

While three bypass valve assemblies 140 are shown, various numbers of valves may be utilized along the axial length of the suspension damper 100. The spacing of the bypass valve assemblies 140 is dependent on the stroke length of a particular suspension damper 100. In some non-limiting examples, zones can range from 1.75"-3" in length, the opening distance of the rings 150, 160, 170 is a fixed value. Further, each variation or zone is designed to have a true hydraulic top out (full extension) no less than 1" but as large as 2.5" and bump stage (full compression) no less than 1.75" but as large as 3.5".

Figures 5A, 5B:
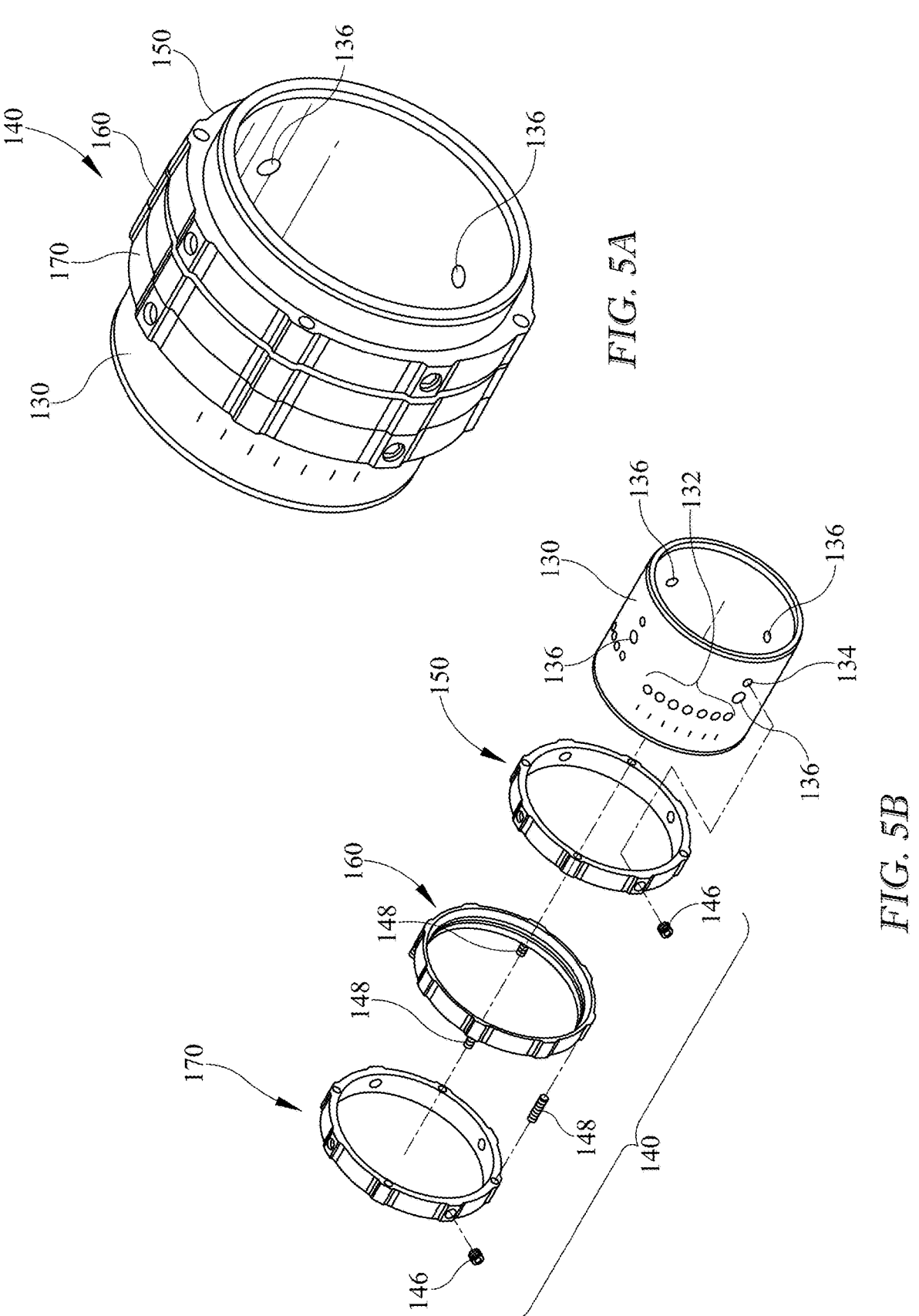
FIGS. 5A and 5B are a perspective view of one adjustable bypass valve assembly with a portion exploded, according to some embodiments.

Referring now to FIGS. 5A and 5B, a schematic perspective view of a portion of the sleeve 130 is depicted with the one of the bypass valve assemblies 140, and an exploded perspective detail of the bypass valve assembly 140. The sleeve 130 provides a seat for various rings 150, 160, 170 which may be adjusted in order to adjust flow rate of fluid movement of the suspension damper 100. The sleeve 130 comprises a plurality of detents 132 spaced apart circumferentially and in a spiral or helical arrangement.

Spaced from the plurality of detents 132 is a base detent 134, which is used to locate and retain one of the rings—a fixed valve seat 150. A thru hole or aperture 136 is disposed between the base detent 134 and the plurality of detents 132. This thru hole 136 allows movement of viscous fluid from inside the sleeve 130 to the exterior of the sleeve 130, and the rate or volume of fluid movement is controlled by each bypass valve assembly 140.

Also shown in the exploded detail portion of FIG. 5B are the three rings—the fixed valve seat 150, the floating valve ring 160 and the adjustable valve seat 170. The fixed valve seat 150 is located and retained at the base detent 134. One or more set screws or other fasteners may be used to fasten the fixed valve seat 150 relative to the sleeve 130.

The adjustable valve seat 170 is positioned over the plurality of detents 132 and one or more set screws 146 may be used to locate and retain the adjustable valve seat 170. Since the plurality of detents 132 are in a spiral or helical arrangement, rotation of the adjustable valve seat 170 to the different detents results in variation of the axial location of the adjustable valve seat 170 along the sleeve 130. That is, the adjustable valve seat 170 may be closer or further from the fixed valve seat 150. The plurality of detents 132 therefore provide the maximum valve gap for the adjustable valve seat 170. In some embodiments, the sleeve may have four sets of the plurality of detents that are spaced apart about 90 degrees.

Disposed between the adjustable valve seat 170 and the fixed valve seat 150 is the floating valve ring 160. The floating valve ring 160 is captured between the fixed valve seat 150 and the adjustable valve seat 170. The movability of the adjustable valve seat 170 provides that the spacing for the floating valve ring 160 may be varied by adjustment of the adjustable valve seat 170 relative to the plurality of detents 132. More specifically, the rotation of the adjustable valve seat 170 changes the spacing or gap between the adjustable valve seat 170 and the floating valve ring 160. This movability allows for variation of fluid flow through each bypass valve assembly 140.

During operation the floating valve ring 160 is movable between the fixed valve seat 150 and adjustable valve seat 170. When the adjustable valve seat 170 is rotated to a position closest to the fixed valve seat 150, the minimal movement, or no movement, only allows for the least amount of viscous fluid from inside the sleeve 130 to out. This provides the least amount of fluid flow and the stiffest suspension setting and the highest crack pressure. Alternatively, when the adjustable valve seat 170 is rotated to a position furthest from the fixed valve seat 150, the maximum movement of the floating valve ring 160 allows for the most amount of the viscous fluid from inside the sleeve 130 to outside. This provides the softest suspension setting and least crack pressure.

In the depicted embodiment, but without limitation, the plurality of detents 132 are shown providing 6 positions. The adjustable valve seat 170 is located by the plurality of detents 132. One or more set screws 146 may be used to set the position of the adjustable valve seat 170, and therefore the floating valve ring 160, relative to one of the detents of the plurality of detents 132. For example, each of the positions may be spaced apart about 10 degrees of rotation for the adjustable valve seat 170, 10 for each position change. For each rotation position, the spacing between the adjustable valve seat 170 and the floating ring 160 may vary.

One or more springs 148 are located between the floating ring 160 and the adjustable valve seat 170. The one or more springs 148 force the floating ring 160 away from the adjustable valve seat 170 and toward the fixed valve seat 150. When viscous fluid moves from the inside of the sleeve 130 through the sleeve thru hole 136, the floating ring 160 moves against the spring force toward the adjustable valve seat 170. Once the fluid force is removed, the floating ring 160 moves back toward the fixed valve seat 150 under the spring 148 force.

Figure 6A:
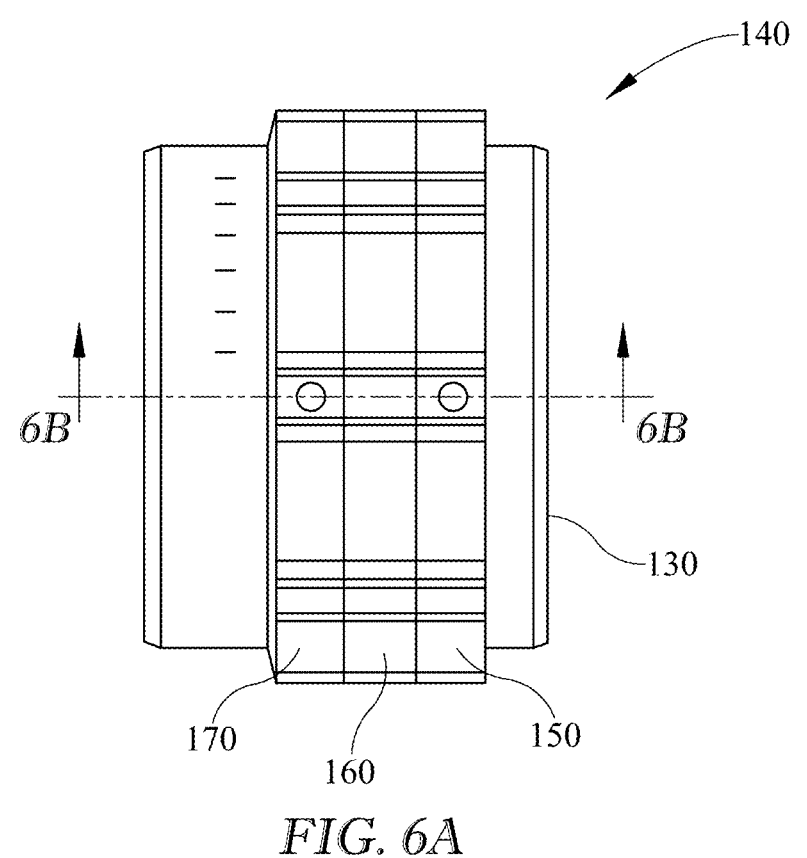
FIGS. 6A and 6B are a first sequence view of the adjustable bypass valve assembly according to some embodiments.
Figure 6B:
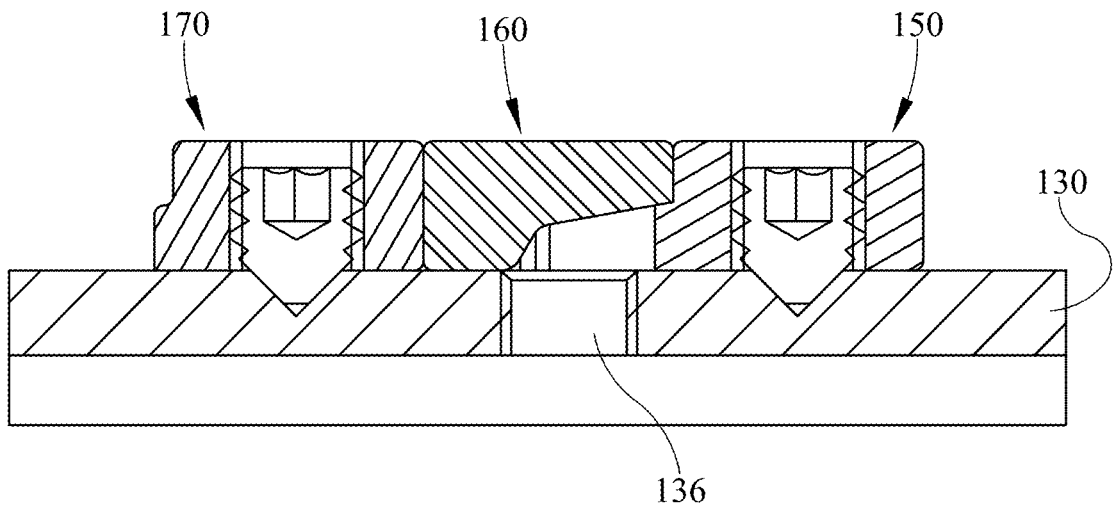
Figure 7A:
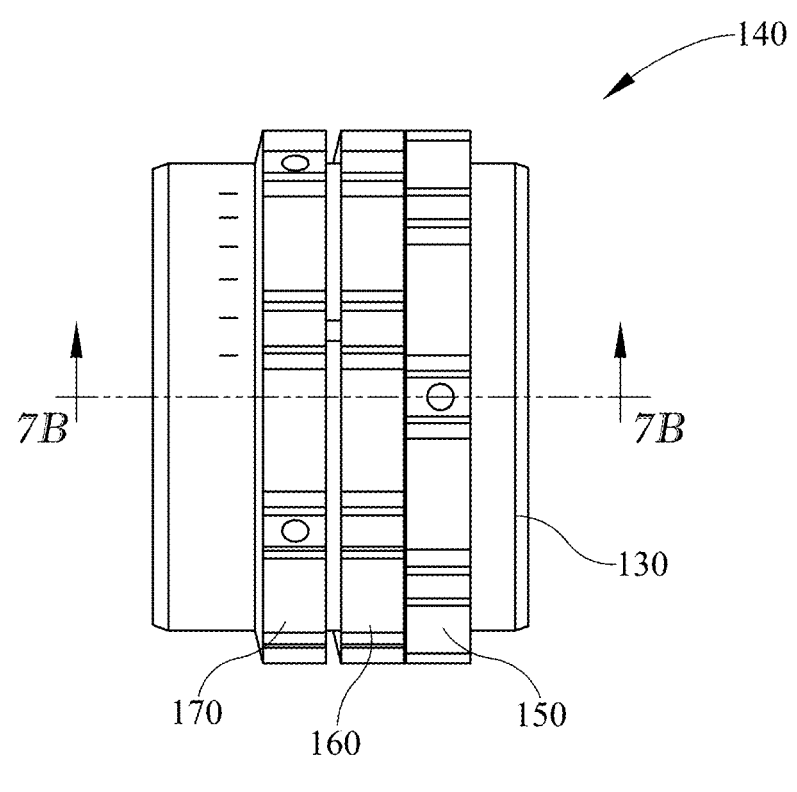
FIGS. 7A and 7B are a second sequence view of the adjustable bypass valve assembly according to some embodiments.
Figure 7B:
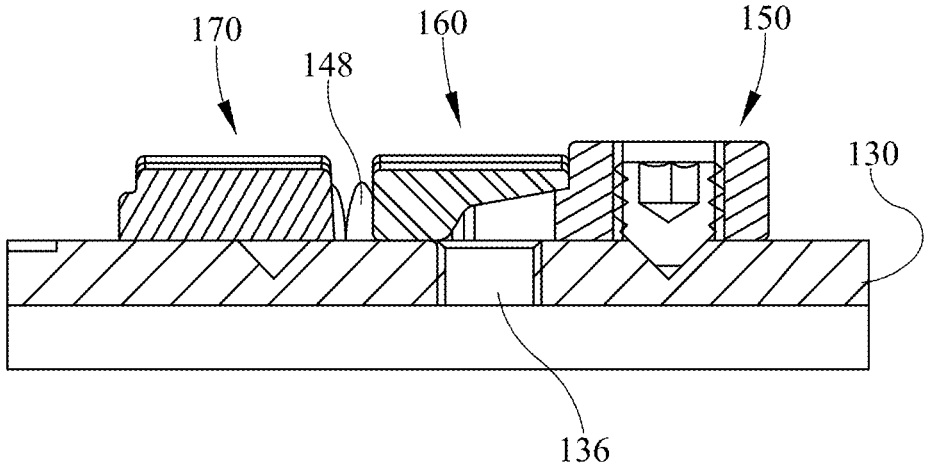

As shown in FIGS. 6A-B and 7A-B, the bypass valve 140 adjustment is shown and described. As previously described, the sleeve 130 comprises the plurality of detents 132 (FIG. 5A). For example, in some embodiments, seven detents are provided, which therefore provide seven positions for the adjustable valve seat 170. In FIG. 6A-B, the smallest gap position is shown wherein the adjustable valve seat 170 is positioned closest to the fixed valve seat 150. In this configuration, the least amount of fluid can pass through the valve assembly 140, thus providing a stiffer suspension setting and higher cracking pressure. In FIG. 7A-B, the largest gap position is shown wherein the adjustable valve seat 170 is furthest from the fixed valve seat 150. This allows the most amount of viscous fluid to pass through the valve assembly 140, thus providing a softer suspension setting and lower cracking pressure. In adjusting the adjustable valve seat 170 between the various detents 132, the spacing between the floating valve ring 160 and adjustable valve seat 170 increases, which allows opening of the valve with softer crack pressures due to extension of the springs 148.

As noted previously, the rotation of the adjustable valve seat 170 results in varied spacing between the adjustable valve seat 170 and the floating ring 160. This allows movement of the floating ring 160 relative to the adjustable valve seat 170. In some embodiments, and without limitation, each rotation of the adjustable valve seat 170 may result in a gap between the adjustable valve seat 170 and the floating ring 160 of between about 0.010 inches and 0.030 inches.

In operation, during a compression event, zones toward full extension will have a softer setting compared to zones near full compression creating a progressive ramp up in force required to compress the suspension damper 100 the closer it gets to being fully collapsed. When the bump stage is reached, a large increase in resistance is created.

Alternatively, on a rebound event, zones towards fully compressed will require more force and progressively reduce in resistance as the suspension damper 100 extends, starting in a hold zone and ultimately increasing in resistance again at the top out zone preventing harsh full extension.

Figure 8A:
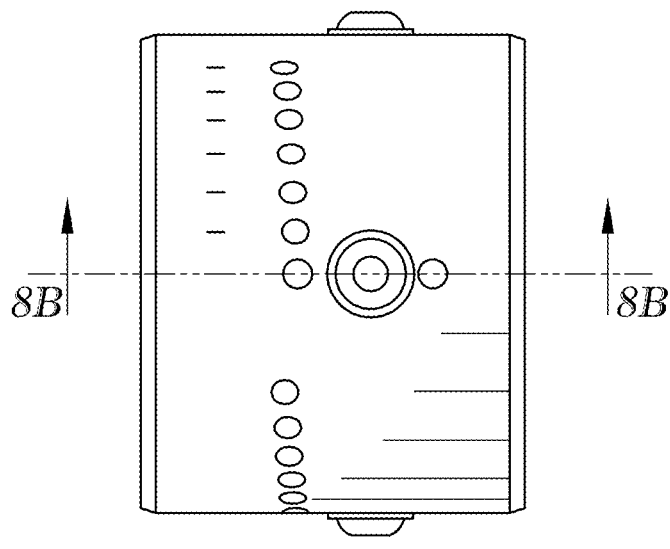
FIGS. 8A and 8B are a third sequence view of the adjustable bypass valve assembly according to some embodiments; and, FIG. 9 is a section view of valve ring of the bypass valve assembly, according to some embodiments.
Figure 8B:
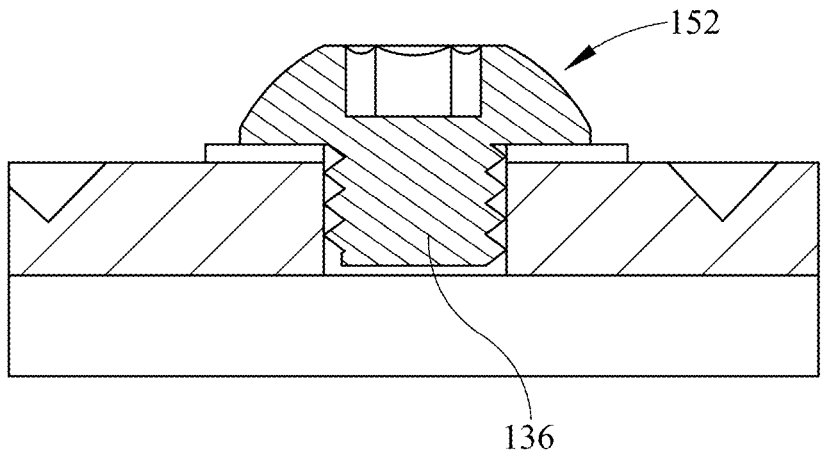

As shown in FIGS. 8A and 8B, in further embodiments, the rings defining the valve assembly 140 may be removed and the thru hole 136 may simply be plugged with a fastener 152. This stops fluid flow in this area. This is a further option such that some areas of the sleeve may not have a bypass valve 140 but may instead be plugged.

Figure 9:
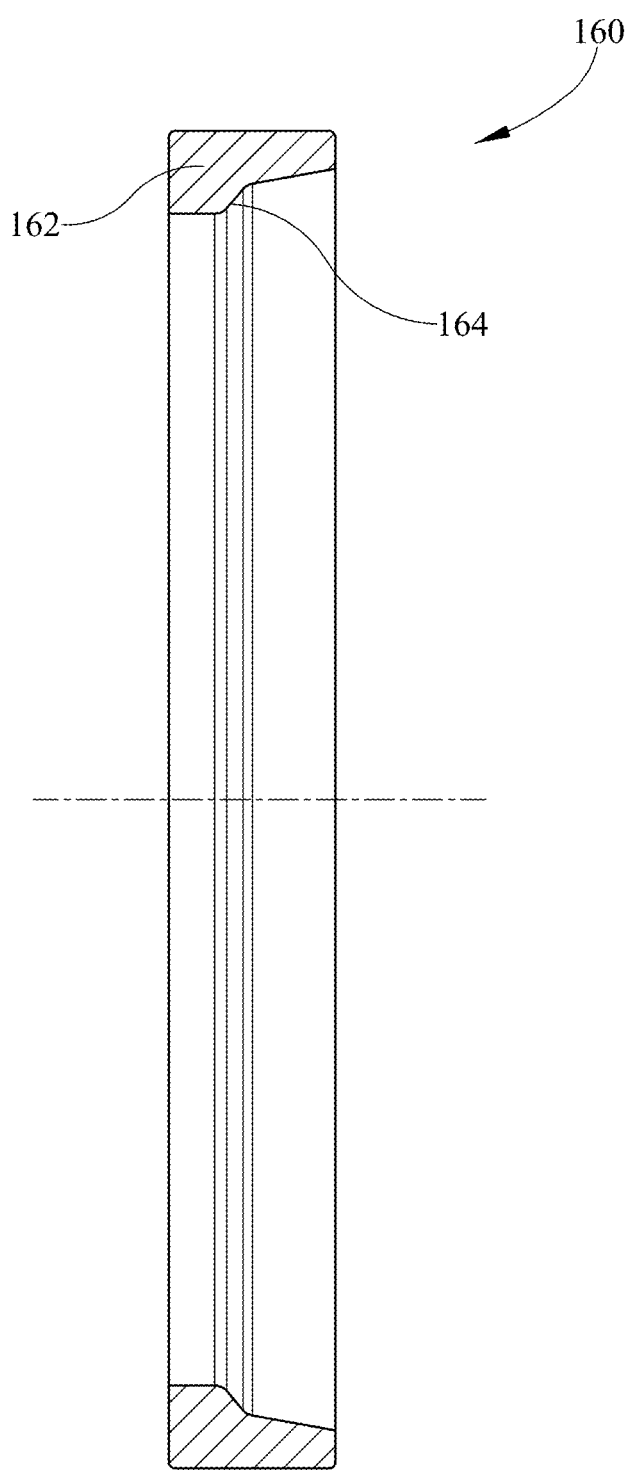

Referring now to FIG. 9, a section view of the floating valve ring 160 is shown. The floating valve ring 160 has a varying cross section in the axial direction to increase thickness moving in the axial direction. In addition to the increased strength in this thickened area 162 of the floating valve ring 160, an angled interior surface 164 provides an engagement location which fluid force may more consistently move the floating valve ring 160. As shown in the various figures, the outer profile of the rings 150, 160, 170 may also be provided with strengthening ridges, which improve rigidity of the rings when under load of the fluid pressure. Next to the fixed valve seat 170 is a floating valve ring 160.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

Certain terminology is used in the following description for convenience only and is not limiting. The words "right," "left," "top," and "bottom" designate directions in the drawings to which reference is made. The words "a" and "one" are defined as including one or more of the referenced item unless specifically stated otherwise. This terminology includes the words above specifically mentioned, derivatives thereof, and words of similar import. The phrase "at least one" followed by a list of two or more items, such as A, B, or C, means any individual one of A, B or C as well as any combination thereof.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A suspension damper, comprising:
an external cylinder and a piston movable within said external cylinder;
said piston having a piston rod;
an internal sleeve, positioned within said external cylinder, said internal sleeve having one or more thru holes for transfer of fluid from within said internal sleeve to between said internal sleeve and said external cylinder, and a plurality of detents disposed on said internal sleeve;
a fluid reservoir which houses a damping fluid, said fluid reservoir in fluid communication with said external cylinder by connection with first and second fluid conduits;
two or more bypass valve assemblies disposed between said internal sleeve and said external cylinder, each of said bypass valve assemblies comprising:
a fixed valve seat positioned on an exterior of said internal sleeve;
a floating valve ring; and,
an adjustable valve seat, wherein a position of said adjustable valve seat may be varied to adjust a gap between said adjustable valve seat and said floating valve ring.

2. The suspension damper of claim 1, said internal sleeve further comprising a fixed detent for positioning of said fixed valve seat.

3. The suspension damper of claim 1, said plurality of detents comprising a helical arrangement to provide differing axial spacing between said adjustable valve seat and said floating valve ring.

4. The suspension damper of claim 3, said thru hole positioned between said floating valve ring and said adjustable valve seat.

5. The suspension damper of claim 4, said adjustable valve seat being rotatable to different positions of said helical arrangements of said plurality of detents.

6. The suspension damper of claim 5, said different positions changing said axial spacing between said adjustable valve seat and said floating valve ring.

7. The suspension damper of claim 1, said adjustable valve seat and said floating valve ring each having an axially oriented spring seat.

8. The suspension damper of claim 7, further comprising a spring disposed in said axially oriented spring seat between said adjustable valve seat and said floating valve ring.

9. The suspension damper of claim 8, wherein said two or more bypass valve assemblies are spaced apart axially between said external cylinder and said internal sleeve.

10. The suspension damper of claim 9, said two or more bypass valve assemblies being spaced apart axially along said internal sleeve.

11. The suspension damper of claim 1, each of said two or more bypass valve assemblies allowing variation of flow rate therethrough.

12. The suspension damper of claim 11, said two or more bypass valve assemblies allowing for tuning of bypass flow at different locations along an axial length of said internal sleeve to change the force needed to move said piston.

* * * * *